United States Patent
Doskocil

(10) Patent No.: US 11,917,434 B2
(45) Date of Patent: Feb. 27, 2024

(54) SYSTEM FOR AUTOMATED MAPPING OF WIRELESS NETWORK QUALITY

(71) Applicant: MP Antenna, Ltd., Elyria, OH (US)

(72) Inventor: Adam Doskocil, Hinckley, OH (US)

(73) Assignee: MP ANTENNA, LTD, Elyria, OH (US)

( * ) Notice: Subject to any disclaimer, the term of this patent is extended or adjusted under 35 U.S.C. 154(b) by 255 days.

(21) Appl. No.: 17/343,991

(22) Filed: Jun. 10, 2021

(65) Prior Publication Data

US 2021/0392528 A1 Dec. 16, 2021

Related U.S. Application Data

(60) Provisional application No. 63/037,743, filed on Jun. 11, 2020.

(51) Int. Cl.
*H04W 24/08* (2009.01)
*G01S 19/42* (2010.01)
*H04L 67/12* (2022.01)

(52) U.S. Cl.
CPC ............ *H04W 24/08* (2013.01); *G01S 19/42* (2013.01); *H04L 67/12* (2013.01)

(58) Field of Classification Search
CPC ..... H04W 24/08; H04W 24/04; H04W 24/10; G01S 19/42; H04L 67/12
See application file for complete search history.

(56) References Cited

U.S. PATENT DOCUMENTS

2019/0204088 A1* 7/2019 Haque ..................... G06N 3/02
2019/0320061 A1* 10/2019 Salandy-Defour ... H04W 4/025

\* cited by examiner

*Primary Examiner* — Kim T Nguyen
(74) *Attorney, Agent, or Firm* — TAROLLI, SUNDHEIM, COVELL & TUMMINO L.L.P.

(57) ABSTRACT

Systems and methods are provided for automated mapping of wireless network quality. A client device includes a processor, a network port configured to receive data from a receiver, and a global positioning system (GPS) module configured to determine a position of the client device. A network interface controller is configured to communicate with a server. A client memory stores a data collector configured to associate data received at the network port with a position of the client device when the data was received and provide the data and associated location to the network interface controller for transmission to the server. The server includes a processor, a network interface controller configured to communicate with the client device, and a memory. The server memory stores a data analyzer that determines, for each position of the client device, a set of at least one data quality metric for the receiver.

20 Claims, 5 Drawing Sheets

SYSTEM FOR AUTOMATED MAPPING OF WIRELESS NETWORK QUALITY

RELATED APPLICATIONS

This application claims priority to U.S. Provisional Patent Application Ser. No. 63/037,743, filed Jun. 11, 2020 and entitled "SYSTEM FOR AUTOMATED MAPPING OF WIRELESS NETWORK QUALITY," which is hereby incorporated by reference in its entirety.

TECHNICAL FIELD

This invention relates to radio communications, and more particularly, to a system for automated mapping of wireless network quality.

BACKGROUND

Telecommunications are essential for the modern digital economy. Without adequate and sufficient connectivity, many of the economic and societal benefits associated with myriad technological solutions can be lost. Indeed, wireless communications is the bedrock of the smart movement, predicated on the pervasive embedding of Internet-connected devices into the physical environment.

SUMMARY OF THE INVENTION

In accordance with an aspect of the present invention, a system includes a client device and a server. The client device includes a first processor, a network port configured to receive data from a receiver, and a global positioning system (GPS) module configured to determine a position of the client device. A first network interface controller is configured to communicate with a server associated with the client device. A first non-transitory computer readable medium stores instructions executable by the processor. The executable instructions include a data collector configured to associate data received at the network port with a position of the client device when the data was received and provide the data and associated location to the network interface controller in an appropriate form for transmission to the server.

The server includes a second processor, a second network interface controller configured to communicate with the client device, and a second non-transitory computer readable medium that stores instructions executable by the processor. The executable instructions include a data analyzer that determines, for each of a plurality of positions of the client device, a set of at least one data quality metric for the receiver.

In accordance with another aspect of the present invention, a method is provided. Data is received from a receiver at a client device and assigned a location from a global positioning system (GPS) module. The data from the receiver and the assigned location are provided to an associated server. At the server, a set of at least one data quality metric for the receiver is determined for each of a plurality of locations.

In accordance with yet another aspect of the present invention, a system includes first and second client devices and a server. The first client device includes a first processor, a first network port configured to receive data from a first receiver, and a first global positioning system (GPS) module configured to determine a position of the first client device. A first network interface controller is configured to communicate with a server associated with the first client device. A first non-transitory computer readable medium stores instructions executable by the first processor. The executable instructions include a first data collector configured to associate data received at the first network port with a position of the first client device when the data was received and provide the data and associated location to the first network interface controller in an appropriate form for transmission to the server.

The second client device includes a second processor, a second network port configured to receive data from a second receiver, and a second global positioning system (GPS) module configured to determine a position of the second client device. A second network interface controller is configured to communicate with a server associated with the second client device. A second non-transitory computer readable medium stores instructions executable by the second processor. The executable instructions include a second data collector configured to associate data received at the second network port with a position of the second client device when the data was received and provide the data and associated location to the second network interface controller in an appropriate form for transmission to the server. The server includes a third processor, a third network interface controller configured to communicate with each of the first and second client devices, and a third non-transitory computer readable medium that stores instructions executable by the processor. The executable instructions include a data analyzer that determines, for each of a plurality of positions of the first and second client devices, a set of at least one data quality metric.

DETAILED DESCRIPTION

Systems and methods for automated mapping of wireless network quality. Specifically, a stand-alone device can be connected to a receiver to collect data received at the receiver and tag the data with a location at which it was received. This can be done over a plurality of locations within a region of interest to collect representative data for the region of interest. In one example, the stand-alone device and receiver can be carried across the region of interest by a manned, remote controlled, or autonomous vehicle, such as an unmanned air vehicle, item of farm equipment, heavy equipment, or motor vehicle. This data is then analyzed at a server to provide a mapping of data quality over the region of interest.

Figure 1:
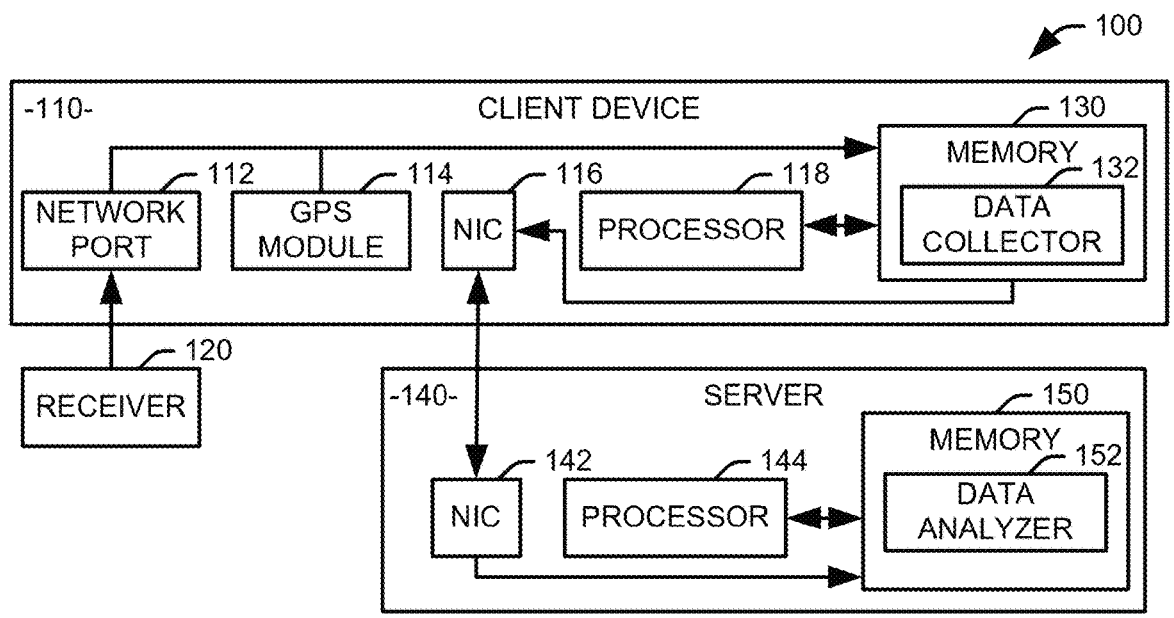
FIG. 1 illustrates a system for mapping the performance of a wireless network.

FIG. 1 illustrates a system 100 for mapping the performance of a wireless network. It will be appreciated that the wireless network can include any wireless network covering an area sufficient large to warrant mapping the performance of the network across an area and can include, for example, wireless local area networks (LANs), wide area networks (WANs), metropolitan area networks (MANs), satellite networks, cellular networks, and ad hoc networks. Accordingly, the source of the wireless network can be a single transmitter, a group of interconnected terrestrial transmitters, one or more vehicle mounted transmitters, a group of geosynchronous or low earth orbit satellites, or a combination of such sources. Data can be transferred on the wireless network via radio waves, microwaves, and, in some instances of line-of sight communication, optical and infrared light.

The system 100 includes a client device 110 that is connected to a receiver 120 configured to receive data via the wireless network at a network port 112. It will be appreciated that the receiver 120 can be any device that is capable of communicating on the wireless network and being connected to the client device 110 via an appropriate wired connection. The network port 112 can be any connection through which data can be exchanged between the receiver 120 and the client device 110. In one implementation, the network port 112 can be configured to receive a category 5 cable connection from the receiver 120. In another implementation, the network port 112 is implemented as a universal serial bus (USB) port.

The client device 110 further includes a global positioning system (GPS) module 114 that is configured to determine a position of the client device 110. A network interface controller (NIC) 116 allows the client device 110 to communicate with an associated server 140. It will be appreciated that the client device 110 can communicate with the server 140 over any appropriate network, not necessarily the wireless network evaluated by the system 100, and can, in some instances, communicate with the server via a short range connection such as Bluetooth or line-of-sight optical communication.

The client device 110 further includes a processor 118 and a memory 130, implemented as a non-transitory computer-readable medium, that stores machine-readable instructions executable by the processor. In the illustrated example, the machine-readable instructions include a data collector 132 configured to associate data received at the network port 112 with a position of the client device when the data was received from the GPS module 114. It will be appreciated that the data can be collected at regular time intervals, with each time interval assigned a location and a string of received data. The data can be stored on the memory 130 until a survey of a region of interest is finished, provided to the server 140 via the network interface controller 136 as soon as it is collected, or saved until a threshold number of time intervals or a threshold file size is achieved and then sent to the server 140. The data collector 132 can be further configured to condition the received data to provide the data to the network interface controller 136 in an appropriate form for transmission to the server.

The server 140 includes a processor 142, a network interface controller (NIC) 144 configured to communicate with the client device 110, and a non-transitory computer readable medium 150 storing instructions executable by the processor. The medium 150 stores a data analyzer 152 that determines, for each of a plurality of positions of the client device 110, a set of at least one data quality metric for the receiver 120 from the data provided from the data collector 132. Metrics of data quality can include, for example, latency, throughput, bandwidth, error rate, and jitter. Any or all of these metrics of data quality can be determined at the data analyzer 152 and provided to the client device 110, another client device (not shown), or an output device (not shown), such as a monitor or touch screen, associated with the server. In one implementation, the server 140 is implemented as a cloud server. In another implementation, the client device 110 and the server 140 can share the same hardware and software elements along with a configuration file, such that a given client device can be reconfigured to act as the server by changing one or more values in the configuration file.

Figure 2:
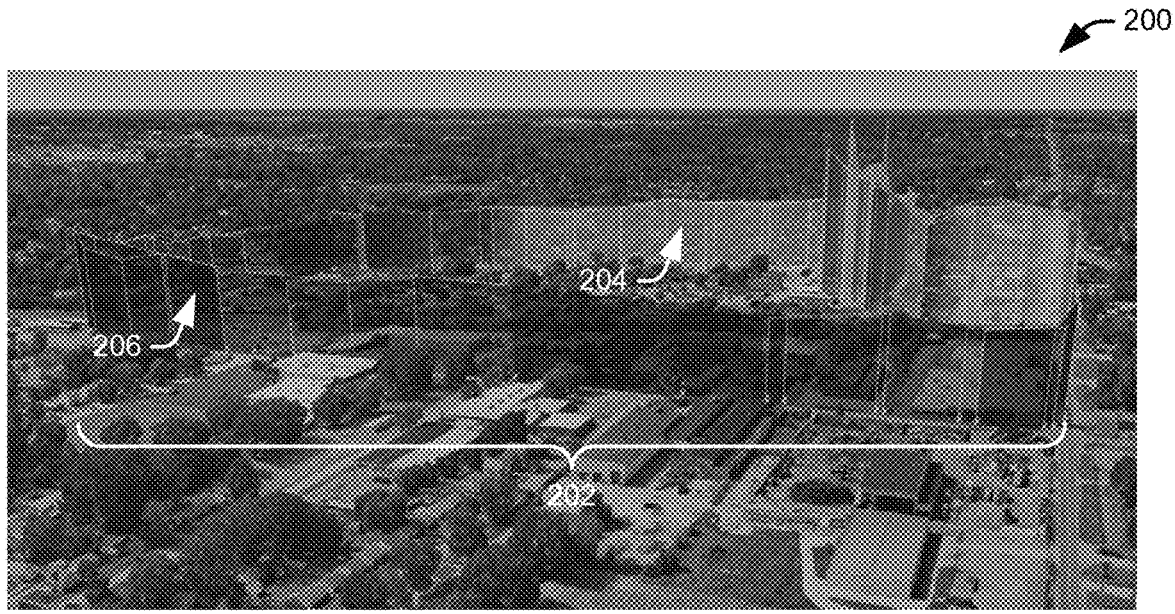
FIG. 2 illustrates a map including a region of interest in which a survey of the area has been performed.

The output of the data analyzer 152 can be provided, for example, as a map of the region of interest with the data quality at each location indicated by an appropriate indicator, such as a number, a symbol, a graph, or color. One example of an output of the data analyzer 152 is illustrated as FIG. 2. FIG. 2 illustrates a map 200 including a region of interest 202 in which a survey of the area has been performed. In the image, regions that have been surveyed, that is, regions for which data has been received by the client device, are represented by a raised track, with small arrows and corresponding vertical lines indicating the intervals at which measurements are taken. Portions of the track with a high grayscale brightness, such as is indicated at 204, represent locations in which the quality of data provided by the client device 110 is high. Portions of the track with a low grayscale brightness, such as is indicated at 206, represent locations in which the quality of data provided by the client device 110 is low. It will be appreciated that this map is merely an example, and that signal quality could be indicated by different colors, a height of the raised track, or various symbols. Further, multiple indicators (e.g., a height of the track as well as color or brightness) could be used to represent multiple metrics of data quality.

In one implementation, the data analyzer 152 is configured to determine, for a given location of the plurality of positions of the client device, a first order Fresnel zone between the given location and a transmitter associated with the receiver. In one implementation, the given location can be selected by a user via an associated input device (not shown). In another implementation, representative locations within the region of interest can be selected for generating the Fresnel zone. The data analyzer 152 can generate a single Fresnel zone for a given location representing a representative frequency for the receiver, or multiple Fresnel zones for each location, each representing one of a plurality of frequencies associated with the receiver.

Figure 3:
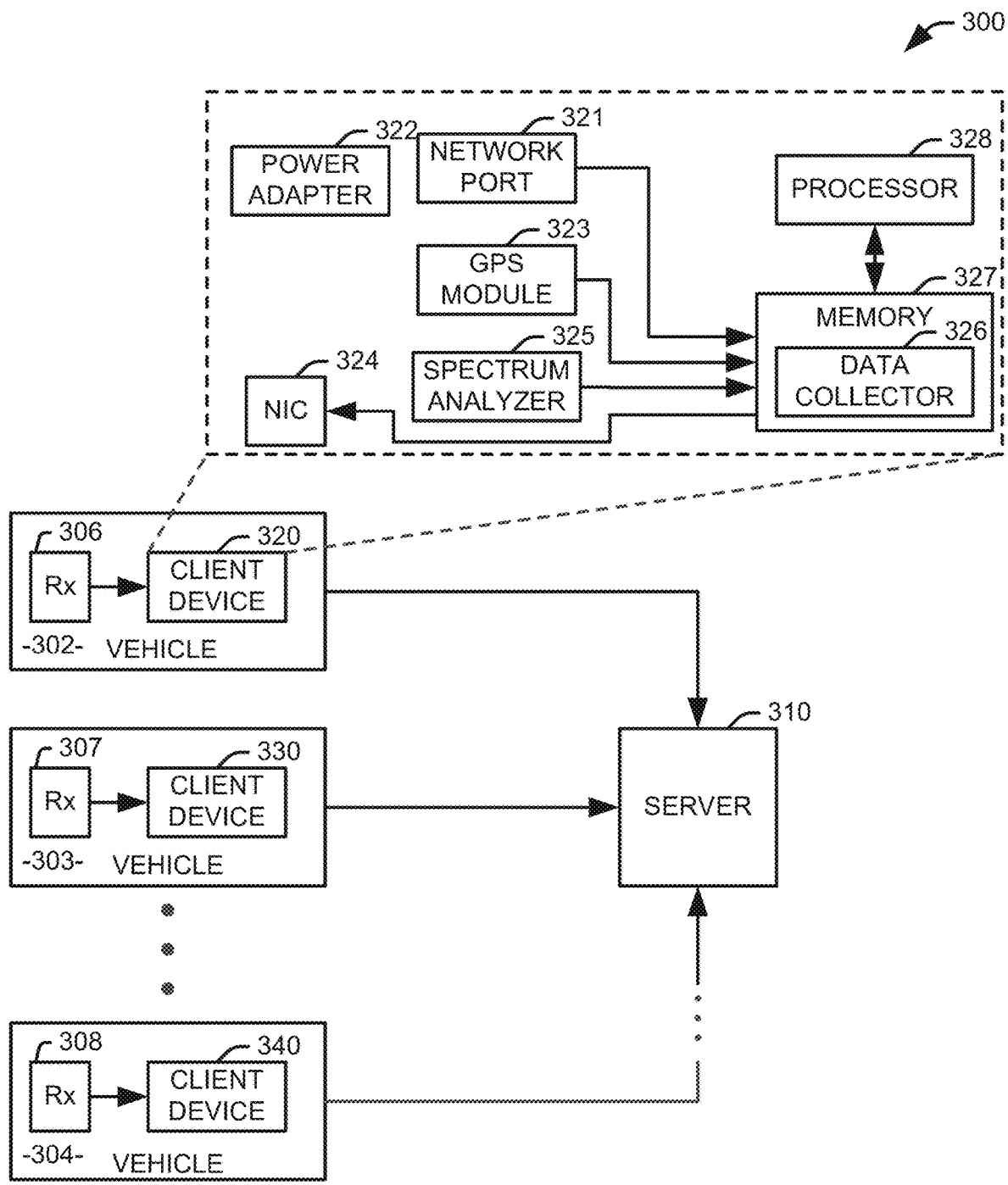
FIG. 3 illustrates another example of a system for mapping the performance of a wireless network.

FIG. 3 illustrates another example of a system 300 for mapping the performance of a wireless network. The system 300 uses a plurality of vehicles 302-304 with a respective plurality of receivers (Rx) 306-308. The vehicles can be ground-based vehicles, such as motor vehicles, heavy equipment, or farm equipment, water-based vehicles, or aircraft. The vehicles can also be either manned, autonomous, or controlled remotely by a human operator or automated system. It will be appreciated that the receivers 306-308 can be integral to the vehicle or carried by the vehicle. In the case of autonomous or remote controlled vehicles, the vehicles 302-304 can receive instructions or transmit recorded data via the wireless network via integral receivers 306-308.

In the illustrated system 300, a server 310 monitors incoming data from three client devices 320, 330, and 340. In the illustrated implementation, each client device (e.g., 320) is implemented as a dedicated computing device that connects to the receiver (e.g., 306) via a network port 321. Each client device (e.g., 320) can be powered by an onboard battery or provided with a power adapter 322 that allows the client device to draw power from the vehicle (e.g., 302). In one implementation, the power adapter 322 can plug into an auxiliary port or cigarette lighter associated with the vehicle. As described previously in FIG. 1, each client device (e.g., 320) includes a GPS module 323 that tracks a location of the client device as the vehicle (e.g., 302) moves through the region of interest and a network controller interface (NIC) 324 that allows the client device to communicate with the server 340.

In the illustrated implementation, each client device (e.g., 320) further comprises a spectrum analyzer 325 configured to analyze signal strength for various frequency ranges. In one example, the spectrum analyzer 325 determines, across a defined frequency range, a strength of a signal received at the receiver across each of a plurality of subranges comprising the defined frequency range. The output of the spectrum analyzer 325, along with the data received from the receiver (e.g., 306) at the network port and the location from GPS module 323, is received at a data collector 326, implemented as machine-readable instructions stored on a non-transitory memory 327 and executed by an associated processor 328. The data collector 326 matches data received from the spectrum analyzer 325 and the receiver data from the network port 321 to the GPS location and provides the data to the network interface controller 324 an appropriate form for transmission to the server 340. In one implementation, the data provided from the spectral analyzer includes the signal strength for at least one of the plurality of subranges and an identity of the subrange.

Figure 4:
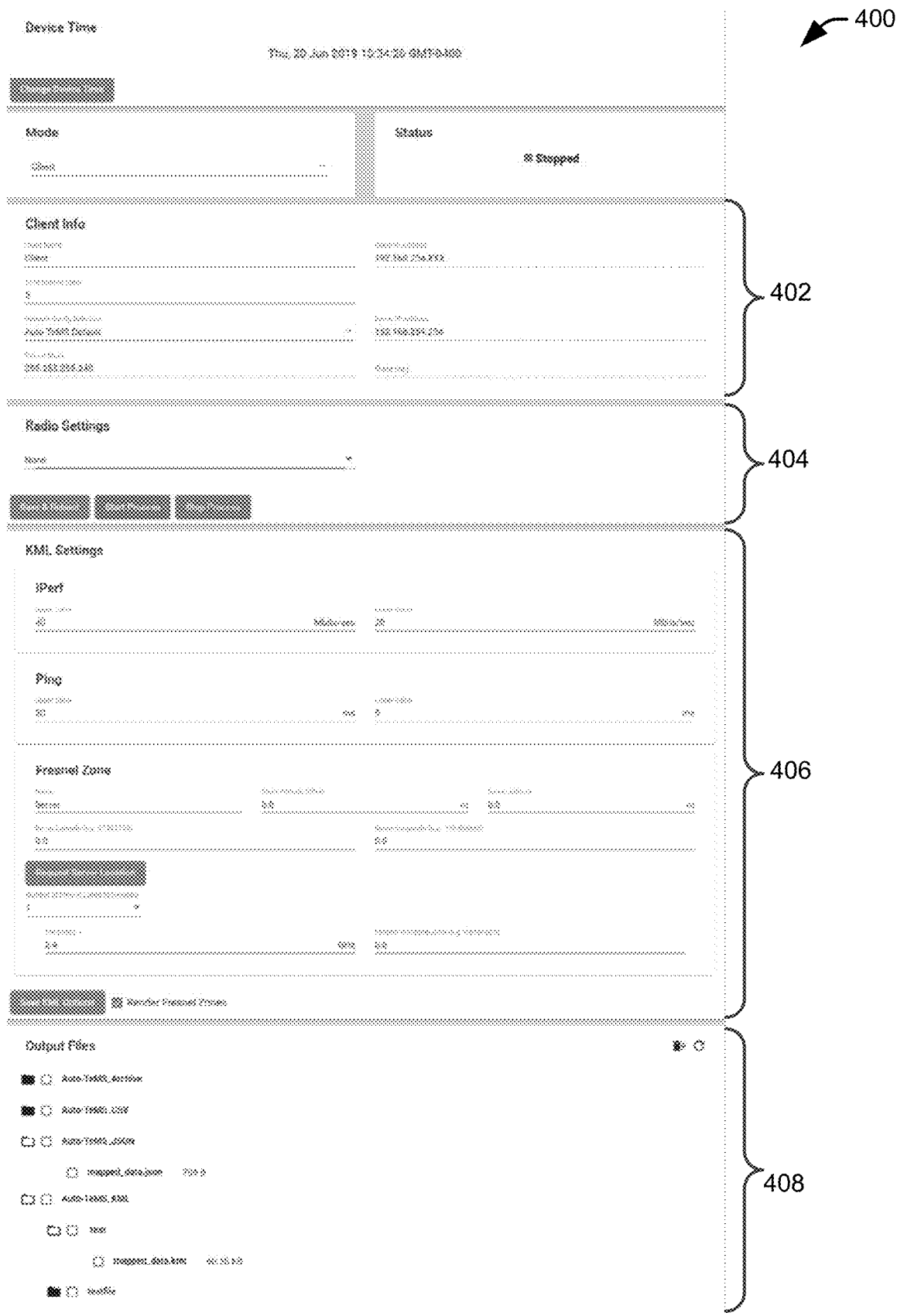
FIG. 4 illustrates a screenshot from an example implementation of a client for the system of FIG. 3.

FIG. 4 illustrates a screenshot 400 from an example implementation of a client for the system of FIG. 3. As can be seen in the screenshot, the client interface has four main sections, namely Client Info 402, where the settings for the client are configured, Radio Settings 404, where the radio settings are specified, Keyhole Markup Language (KML) Settings 406, where the settings for generated KML files, and Output Files 408, which lists output files generated by the client.

The Client Info section 402 contains input fields for the client name, which will appear in the client list on the server, and the client IP address. The current IP address of the client appears in this field. In the default configuration or Dynamic Host Configuration Protocol (DHCP), the client IP will appear when an IP address is assigned from the server. In a manual mode, this field is assigned by the user. A time interval field allows the user to specify, in seconds, how often data should be collected. This allows for clients implemented on more quickly moving vehicles to provide data similar to clients on slower vehicles.

A network configuration selection allows the user to select among various network configuration modes, including a default mode, a manual mode, and a DHCP. The default will make the client attempt to get an IP address from an associated server DHCP, while the DHCP mode makes the client connect using standard DHCP from any DHCP server. The manual mode makes all disabled fields editable so you can set the network info for the client manually. A server IP address field allows an IP address for the server to be provided. In the default mode, the server address is automatically provided. Similarly, a subnet mask field displays a subnet mask for the client. This is entered manually in the manual mode, provided by the DHCP server in the DHCP mode, and set to a default value in the default mode. A gateway field displays the current gateway for the client. The gateway field contains a value provided by the user in the manual mode, is filled with the address of the DHCP server in the DHCP mode, and is empty in manual mode.

The radio settings section 404 allows a user to configure the settings for supported radios to allow for gathering from the radio during testing. A dropdown allows the user to select from a list of radios to configure. A radio IP address field allows the user to input an IP address of the radio so that the client can communicate with the radio. A radio communication IP address field allows the user to enter an IP address for the client that is used by the radio during communication. A radio port field allows the user to select a port that the radio uses to communicate with its application program interface (API), and a password field allows the user to input a password required for login, if any.

The KML settings section 406 allows the user to configure how the client should generate a KML file used for output. It will be appreciated that the system illustrate in FIG. 4 is an example, and that other file types and data formats can be used by the data collector for transmitting data to the server. Upper and lower threshold values for throughput, in this instance, using iPerf for throughput evaluation, can be selected at respective input fields. These threshold values can be used for the mapping processing with measured values above the upper threshold designated in a "good signal" category, for example, shown as green lines on a throughput map, and measured values below the lower threshold value designated in a "bad signal" category, for example, shown as red lines on the throughput map. Measured values in between the two threshold values are designated in an "intermediate signal" category, shown as yellow lines on the throughput map.

Similarly, upper and lower threshold values for latency can be selected at respective ping input fields. These threshold values can be used for the mapping processing with measured values above the upper threshold designated in a "good signal" category, for example, shown as green lines on a latency map, and measured values below the lower threshold value designated in a "bad signal" category, for example, shown as red lines on the latency map. Measured values in between the two threshold values are designated in an "intermediate signal" category, shown as yellow lines on the latency map.

A checkbox is provided for activating generation of Fresnel zones. When checked, this will show a Fresnel Zones section to allow Fresnel zones to be generated in the KML. A server name is the name shown at the location of the server in the generated KML file, as well as values for client altitude and server altitude. The client value can be edited if the generated KML is not showing points at the correct altitude due to either an inaccurate GPS or a mapping service rendering the ground too low or high to offset the height to an appropriate value. Similarly, the altitude, latitude, and longitude of the server can be entered to ensure that it renders at the correct location. If the server has a GPS attached, then a request server location button can be used to get its exact geolocation automatically. A number, frequency, and diameter, expressed as a percent, can also be selected, and all of the KML configuration values can be saved via a Save KML Options button.

The output file section 408 contains files that have been created by the client device. Files can be right clicked to show actions to be performed on the files. A clean button, presented as a trash can, deletes any files below a file size considered to be invalid data. A refresh button refreshes the list of files so that any newly generated files will be shown. The files are divided into archived files and various sections representing file types, such as JSON, CSV, and KML files.

Right click options include downloading selected files from the device, deleting or archiving files, file conversion options, and merging files.

Returning to FIG. 3, the server 310 analyzes received data to determine a quality metric for each location of the plurality of locations. The quality metric can include, for example, one or both of a throughput of the connection between the receiver and an associated transmitter and a latency of the connection between the receiver and the transmitter. The server 310 can use the generated quality metric for the plurality of locations to generate a mapping of the quality metric across a location of interest, as shown in the example of FIG. 2. The server 310 can also determine from the information provided by the spectrum analyzer 325 if the mapped region includes any signals expected to interfere with reception at one of a set of frequencies associated with the receiver. Specifically, unexpected regions of high signal power within the frequency band at various locations can be noted and used to estimate a source of interfering signals. The server 310 can also generate Fresnel zones for various locations within the region of interest based on data provided by the client devices 320, 330, and 340.

Figure 5:
FIG. 5 illustrates a screenshot from an example implementation of a server for the system of FIG. 3.

FIG. 5 illustrates a screenshot 500 from an example implementation of a server for the system of FIG. 3. The server interface has three main sections, a Server Info section 502 that contains server configuration fields, a Maps section 504 that provides a map when an appropriate mapping API is provided, and a Clients section 506 that displays clients that have connected to the server. The Server Info section 502 includes a network configuration selection that selects between a default mode that runs the server as a DHCP server, allowing clients to connect by obtaining an IP address, and a manual mode that makes IP Address, subnet Mask, and gateway fields editable so that you can set the network info for the server manually. In the default mode, the IP address field is assigned automatically and the subnet and gateway fields are empty. A save a reboot button saves a current configuration of the device and reboots the server, a start process button starts the server, and a stop button stops data collection by the server without turning off the device.

A Maps section 304 illustrates a map of the region of interest using an appropriate mapping API, such as a Google Maps API key. The map shows the location of the server and any clients that have connected to the server. Clients will appear as blank markers that can be clicked on to show their name and IP address. If no API key has been set, a set map API button will be available to access a settings screen where a maps API key can be entered. An update clients button refreshes the locations of any clients on the map to show their current locations, and an update server location button can update the server position on the map when the server is moved.

The Clients section 506 includes a list of clients that are currently connected to the server. Each client can be displayed with an IP address of the client, which can be clicked to navigate to the client's web interface, as well as a client name, an average ping of the data currently being collected by the client, and an average throughput of the data currently being collected by the client. A fail count indicates a number of times that the client has lost connection to the server. A connected icon displays a green checkmark then the client is connected and communicating, an orange question mark when the client has lost connection recently, and a red "x" when the device has lost connection to the server for more than a threshold time. The fail count will increase each time a red "x" is displayed. A red minus sign associated with each client can be clicked to remove the client from the list, and a global minus sign icon is available to remove all clients from the list. In general, an audible noise will be produced when a client loses connection to the server. A checkbox is available to mute this alert.

Figure 6:
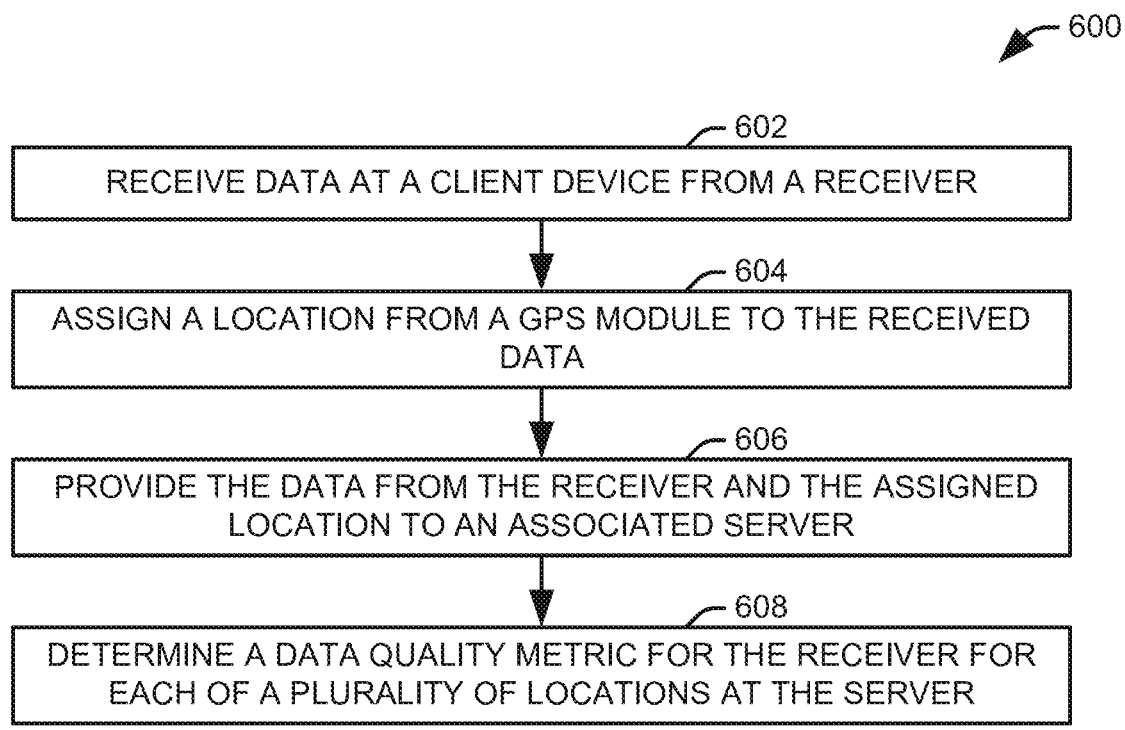
FIG. 6 illustrates a method for automated mapping of wireless network quality.

In view of the foregoing structural and functional features described above, example methods will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 6 illustrates a method 600 for automated mapping of wireless network quality. At 602, data is received at a client device from a receiver. In one example, the receiver is integral with a vehicle, for example, a manned, autonomous, or remotely controlled vehicle, and the client device is placed in the vehicle and receives data from the receiver via a network port. In addition to the received data, the client device can also include a spectrum analyzer that determines a magnitude of received signal at the receiver across each of a plurality of subranges comprising a defined frequency range for the receiver. At 604, a location from a global positioning system (GPS) module is assigned to the received data, and where present, the data from the spectrum analyzer. The received data, any data from the spectrum analyzer, and the assigned location are provided to an associated server at 606.

At 608, a set of at least one data quality metric for the receiver is determined at the server for each of a plurality of locations. In one example, the set of at least one data quality metric includes at least one of a throughput of the connection between the receiver and an associated transmitter, a bandwidth of the connection between the receiver and the transmitter, an error rate of the connection between the receiver and the transmitter, and a latency of the connection between the receiver and the transmitter. The data quality metric or metrics can be used to generate a map representing data quality for the receiver for a region of interest comprising the plurality of locations. Where data is available from the spectrum analyzer, the server can determine, from the magnitude of the received signal in the various subranges, the presence of any signals expected to interfere with reception within a frequency range associated with the receiver. The server can also determine, for one or more locations, first order Fresnel zones between the locations and a transmitter associated with the receiver.

Figure 7:
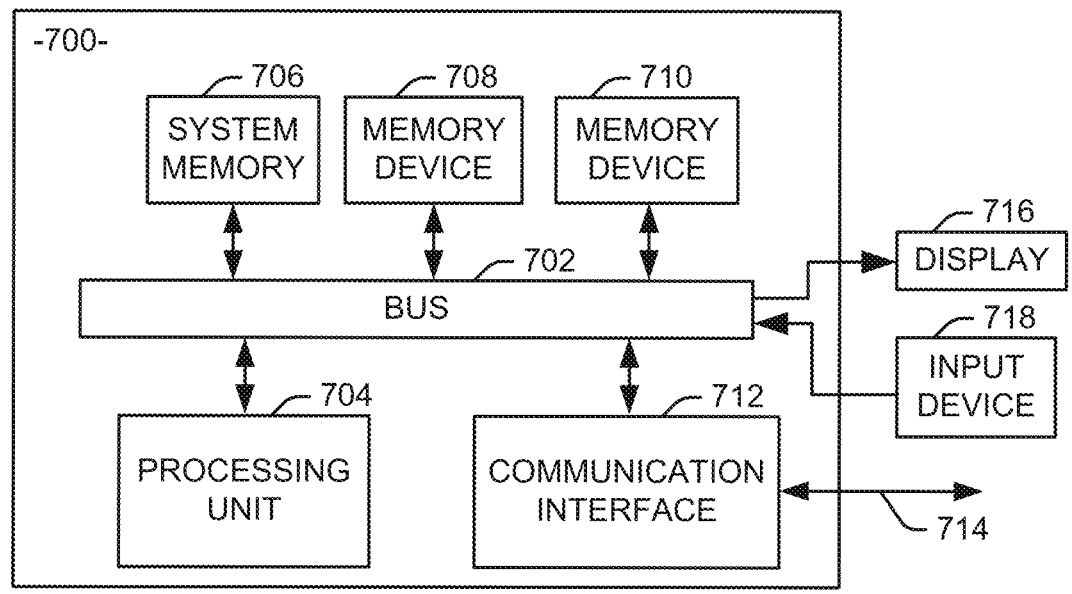
FIG. 7 is a schematic block diagram illustrating an exemplary system of hardware components capable of implementing examples of the systems and methods disclosed herein.

FIG. 7 is a schematic block diagram illustrating an exemplary system 700 of hardware components capable of implementing examples of the systems and methods disclosed herein. The system 700 can include various systems and subsystems. The system 700 can be a personal computer, a laptop computer, a workstation, a computer system, an appliance, an application-specific integrated circuit (ASIC), a server, a server BladeCenter, a server farm, etc.

The system 700 can include a system bus 702, a processing unit 704, a system memory 706, memory devices 708 and 710, a communication interface 712 (e.g., a network interface), a communication link 714, a display 716 (e.g., a video screen), and an input device 718 (e.g., a keyboard, touch screen, and/or a mouse). The system bus 702 can be in communication with the processing unit 704 and the system memory 706. The additional memory devices 708 and 710, such as a hard disk drive, server, standalone database, or other non-volatile memory, can also be in communication with the system bus 702. The system bus 702 interconnects the processing unit 704, the memory devices 706-710, the communication interface 712, the display 716, and the input device 718. In some examples, the system bus 702 also interconnects an additional port (not shown), such as a universal serial bus (USB) port.

The processing unit 704 can be a computing device and can include an application-specific integrated circuit (ASIC). The processing unit 704 executes a set of instructions to implement the operations of examples disclosed herein. The processing unit can include a processing core.

The additional memory devices 706, 708, and 710 can store data, programs, instructions, database queries in text or compiled form, and any other information that may be needed to operate a computer. The memories 706, 708 and 710 can be implemented as computer-readable media (integrated or removable), such as a memory card, disk drive, compact disk (CD), or server accessible over a network. In certain examples, the memories 706, 708 and 710 can comprise text, images, video, and/or audio, portions of which can be available in formats comprehensible to human beings.

Additionally or alternatively, the system 700 can access an external data source or query source through the communication interface 712, which can communicate with the system bus 702 and the communication link 714.

In operation, the system 700 can be used to implement one or more parts of a system for mapping the performance of a wireless network in accordance with the present invention, in particular, the data collector 132 and the data analyzer 152. Computer executable logic for implementing the pain evaluation system resides on one or more of the system memory 706, and the memory devices 708 and 710 in accordance with certain examples. The processing unit 704 executes one or more computer executable instructions originating from the system memory 706 and the memory devices 708 and 710. The term "computer readable medium" as used herein refers to a medium that participates in providing instructions to the processing unit 704 for execution. This medium may be distributed across multiple discrete assemblies all operatively connected to a common processor or set of related processors.

Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a client device comprising:
   a first processor;
   a network port configured to receive data from a receiver;
   a global positioning system (GPS) module configured to determine a position of the client device;
   a first network interface controller configured to communicate with a server associated with the client device; and
   a first non-transitory computer readable medium storing executable instructions executable by the first processor, the executable instructions comprising a data collector configured to associate the data received at the network port with the position of the client device when the data was received and provide the data and the position of the client device associated with the data to the network interface controller in an appropriate form for transmission to the server; and
   the server, comprising:
   a second processor;
   a second network interface controller configured to communicate with the client device; and
   a second non-transitory computer readable medium storing instructions executable by the second processor, the executable instructions comprising a data analyzer that determines, for each of a plurality of positions of the client device, a set of at least one data quality metric for the receiver.

2. The system of claim 1, wherein the client device further comprises a spectrum analyzer configured to determine, across a defined frequency range, a strength of a signal received at the receiver across each of a plurality of frequency subranges comprising the defined frequency range, the data collector associating the signal strength for at least one of the plurality of frequency subranges with a position of the client device when the signal strength is determined and providing the signal strength for the at least one of the plurality of subranges, an identity of the at least one of the plurality of frequency subranges, and the position of the client device when the signal strength is determined to the network interface controller in an appropriate form for transmission to the server.

3. The system of claim 2, wherein the data analyzer determines, from the signal strength for the at least one of the plurality of subranges, the identity of at least one of the plurality of frequency subranges, and the position of the client device when the signal strength is determined, a presence of any signals expected to interfere with reception at one of the plurality of frequency subranges.

4. The system of claim 1, wherein the client device comprises a power connector configured to draw power from an auxiliary power port in a vehicle.

5. The system of claim 1, wherein the data analyzer is configured to determine, for a given location of the plurality of positions of the client device, a first order Fresnel zone for the receiver and associated with the given location.

6. The system of claim 5, wherein the data analyzer is configured to determine the first order Fresnel zone for the receiver and associated with the given location for each of the plurality of frequency subranges.

7. The system of claim 1, wherein the at least one data quality metric comprises one of a throughput of a connection between the receiver and an associated transmitter and a latency of the connection between the receiver and the transmitter.

8. The system of claim 1, wherein the client device is a first client device and the system further comprises a second client device in communication with the server.

9. The system of claim 8, wherein the first client device, the second client device, and the server are nodes in a wireless mesh network, wherein the data received at the network port and the position of the client device associated with the data are provided from the first client device to the server via a first channel of the wireless mesh network, having a first associated frequency, and commands from the server to the first client device and the second client device are provided via a second channel of the wireless mesh network, having a second associated frequency.

10. The system of claim 8, wherein the data analyzer is a first data analyzer, the data collector is a first data collector, and the server further comprises a second network port configured to receive data from a second receiver and a second global positioning system (GPS) module configured to determine a position of the second client device, the first non-transitory computer readable medium further comprising a second data analyzer and a first configuration file, the second non-transitory computer readable medium further comprising a second data collector and a second configuration file, such that the client device can be reconfigured to act as the server by changing one or more values associated with the first configuration file.

11. A method comprising:
   receiving data from a receiver at a client device at each of a plurality of locations;
   determining, for each location of the plurality of locations, a position of the client device when the data received at the receiver is received at a global positioning system (GPS) module;
   providing the data received at the receiver and the position of the client device when the data received at the receiver is received for each location of the plurality of locations to an associated server; and
   determining, at the server, a set of at least one data quality metric for the receiver for each of the plurality of locations.

12. The method of claim 11, the receiver being integral with a vehicle and the method further comprising placing the client device in a vehicle, the client device receiving data from the receiver via a network port.

13. The method of claim 12, wherein the vehicle is an autonomous vehicle.

14. The method of claim 11, further comprising determining, via a spectrum analyzer, a magnitude of a received signal at the receiver across each of a plurality of frequency subranges comprising a defined frequency range for the receiver and determining, from the magnitude of the received signal across the plurality of frequency subranges, a presence of any signals expected to interfere with reception within the defined frequency range for the receiver.

15. The method of claim 11, further comprising determining, for a given location of the plurality of locations, a first order Fresnel zone associated with the receiver for the given location.

16. The method of claim 11, wherein the set of at least one data quality metric comprises at least one of a throughput of a connection between the receiver and an associated transmitter, a bandwidth of the connection between the receiver and the transmitter, an error rate of the connection between the receiver and the transmitter, and a latency of the connection between the receiver and the transmitter.

17. The method of claim 11, further comprising generating, at the server, a map representing the set of at least one data quality metric for the receiver for a region of interest comprising the plurality of locations.

18. A system comprising:
a first client device comprising:
   a first processor;
   a first network port configured to receive data from a first receiver;
   a first global positioning system (GPS) module configured to determine a position of the client device;
   a first network interface controller configured to communicate with a server associated with the client device; and
   a first non-transitory computer readable medium storing a first set of executable instructions executable by the first processor, the first set of executable instructions comprising a first data collector configured to associate the data received at the first network port with the position of the first client device when the data was received at the first network port and provide the data received at the first network port and the position of the first client device when the data was received at the first network port to the first network interface controller in an appropriate form for transmission to the server;
a second client device comprising:
   a second processor;
   a second network port configured to receive data from a second receiver;
   a second global positioning system (GPS) module configured to determine a position of the second client device;
   a second network interface controller configured to communicate with a server associated with the client device; and
   a second non-transitory computer readable medium storing a second set of executable instructions executable by the second processor, the second set of executable instructions comprising a second data collector configured to associate the data received at the second network port with the position of the second client device when the data was received at the second network port and provide the data received at the second network port and the position of the second client device when the data was received at the second network port to the second network interface controller in an appropriate form for transmission to the server; and
the server, comprising:
   a third processor;
   a third network interface controller configured to communicate with each of the first client device and the second client device; and
   a third non-transitory computer readable medium storing a third set of executable instructions executable by the third processor, the third set of executable instructions comprising a data analyzer that determines, for each of a plurality of positions of the first client device and the second client device, a set of at least one data quality metric for the plurality of positions of the first client device and the second client device.

19. The system of claim 18, wherein the set of at least one data quality metric comprises at least two of a throughput of a connection between the receiver and an associated transmitter, a bandwidth of the connection between the receiver and the transmitter, an error rate of the connection between the receiver and the transmitter, and a latency of the connection between the receiver and the transmitter.

20. The system of claim 18, wherein each of the first receiver and the second receiver are implemented within respective first and second vehicles, the first client device being carried by the first vehicle and the second client device being carried by the second vehicle.

* * * * *